United States Patent [19]
Weeks et al.

[11] Patent Number: 5,974,642
[45] Date of Patent: Nov. 2, 1999

[54] BOILER TUBE REMOVAL APPARATUS

[75] Inventors: Bruce V. Weeks, Pataskala; Richard Arthur, New Albany; Gary E. Ingram, Columbus, all of Ohio

[73] Assignee: Advanced Cutting Technologies, Inc., Dublin, Ohio

[21] Appl. No.: 09/094,120

[22] Filed: Jun. 9, 1998

Related U.S. Application Data

[62] Division of application No. 08/814,093, Mar. 10, 1997, Pat. No. 5,826,334.

[51] Int. Cl.⁶ ............................................. B23P 15/26
[52] U.S. Cl. ........................... 29/33 T; 29/727; 29/726; 29/890.031
[58] Field of Search ............................. 29/33 T, 33 G, 29/727, 890.031, 402.03, 402.08

[56] References Cited

U.S. PATENT DOCUMENTS

| | | | |
|---|---|---|---|
| 4,967,468 | 11/1990 | Vossbrick et al. | 29/890.031 |
| 4,979,294 | 12/1990 | Bowman et al. | 29/890.031 |
| 5,033,347 | 7/1991 | Hillestad et al. | 29/402.08 |
| 5,044,075 | 9/1991 | Brennan et al. | 29/890.031 |
| 5,205,038 | 4/1993 | Archer et al. | 29/890.031 |
| 5,893,209 | 4/1999 | Weeks et al. | 29/890.031 |

*Primary Examiner*—Irene Cuda
*Attorney, Agent, or Firm*—Thomas S. Baker, Jr.

[57] ABSTRACT

An apparatus is provided for removing the severed end-portions of boiler tubes installed and retained in a boiler header without consequential boiler header metal damage and in a manner whereby a compression gap of uniform width is machined throughout the length and thickness of each retained boiler tube end-portion selected for removal, the machined boiler tube end-portion is subsequently compressed to significantly close the machined compression gap and reduce the tube end cross-sectional circumference, and the compressed tube end is withdrawn longitudinally from engagement with the boiler header tube-mounting bore.

5 Claims, 4 Drawing Sheets

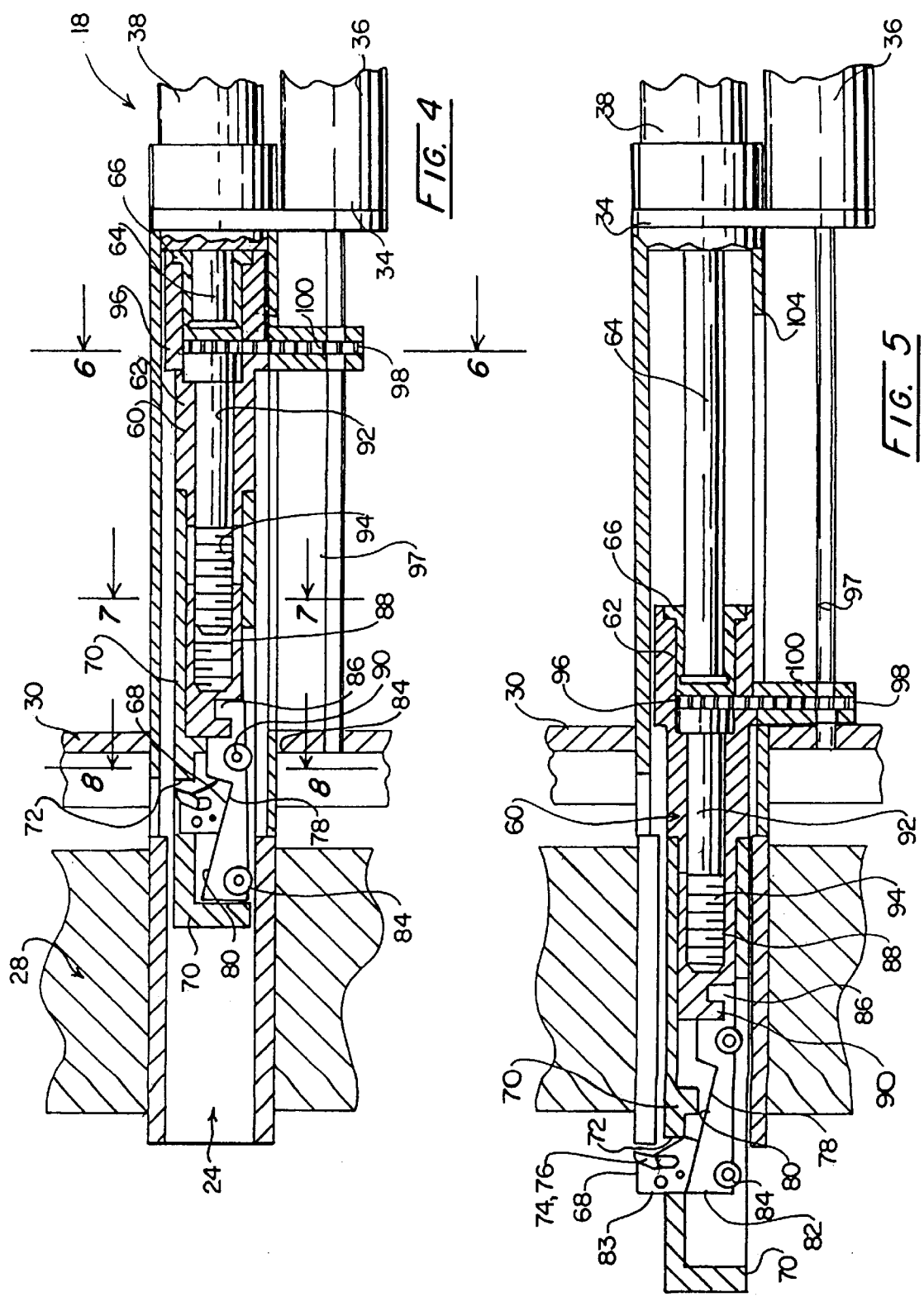

4,642

BOILER TUBE REMOVAL APPARATUS

This is a division of application Ser. No. 08/814,093 filed Mar. 10, 1997, now U.S. Pat. No. 5,826,334.

CROSS-REFERENCES

None.

FIELD OF THE INVENTION

This invention relates generally to tube-type boilers, and particularly concerns both a method and apparatus that may be advantageously utilized in connection with the removal of a boiler tube or tubes from installation in a boiler as f or subsequent replacement.

BACKGROUND OF THE INVENTION

Heretofore it has been common practice in connection with the removal of water tubes or fire tubes from within a steam boiler for subsequent replacement to first cut the installed tubes adjacent their header-mounted ends with a cutting torch, to next remove the cut tube lengths, and afterwards forcefully drive the severed tube ends out of engagement with the boiler headers. Such conventional practice is time consuming, expensive to accomplish, and frequently results in damage to the tube mounting bores provided in the boiler headers. Each damaged tube mounting bore in a tube header must be repaired by welding, re-drilling, and honing to proper size for later re-use.

We have discovered a novel method and apparatus that may be utilized to effect the removal of boiler-tube ends from their mountings within a boiler header without causing damage to the co-operating header tube mounting bores, thus eliminating the necessity for subsequent header metal repair and header bore re-drilling and honing.

Other advantages and objectives of the invention will become apparent in the course of considering the descriptions, drawings, and claims which follow.

SUMMARY OF THE INVENTION

The apparatus of the present invention is basically comprised of a rigid support structure, a pair of spaced-apart hydraulic clamping cylinders carried by the support structure and clamped to the interior surfaces of two installed boiler tube ends adjacent the boiler tube end to be removed, and a centrally-positioned and hydraulically actuated tube end slitting tool also carried by the support structure but co-operating with the boiler tube end to be removed. Also comprising the slitting tool is an electric stepper motor mounted on the support structure and linked to spaced-apart tool bit elements included in the slitting tool. The stepper motor functions to radially advance the reciprocating tool bits through the wall thickness of the boiler tube to be replaced. Further, the apparatus includes a source of pressurized hydraulic fluid, a suitable electrical energy supply, and a selectively operated controller that co-ordinates the reciprocating movement of the hydraulically-actuated slitting tool and the radial advancement of the apparatus tool bits by the system stepper motor.

From a method standpoint, the invention involves the conventional initial step of cutting the boiler tube that is to be replaced adjacent the header tube mounting bores in which the tube is installed, and such is followed by the removal of the cut length of boiler tube. Subsequently the boiler tube ends retained in the boiler headers are removed using the properly clamped invention apparatus to machine a longitudinal gap or slot having a depth corresponding to the thickness of the wall of the retained tube end throughout the tube end length, which length is generally somewhat greater than the thickness of the boiler header plate retaining the tube end. After the gap metal has been removed from the tube end wall throughout its length, the tube end is compressed to close the machined gap and then withdrawn in its compressed condition from co-operation with the boiler header tube mounting bore. Such method steps are readily accomplished without causing any damage to the metal of the tube mounting bore in the boiler header and are less time-consuming and costly to achieve than are conventional boiler tube removal methods.

DESCRIPTION OF THE DRAWINGS

FIGS. 4 and 5 are section views taken at line 4—4 of FIG. 2 through the apparatus slitter subassembly in two different operating positions;

DETAILED DESCRIPTION

Figure 1:
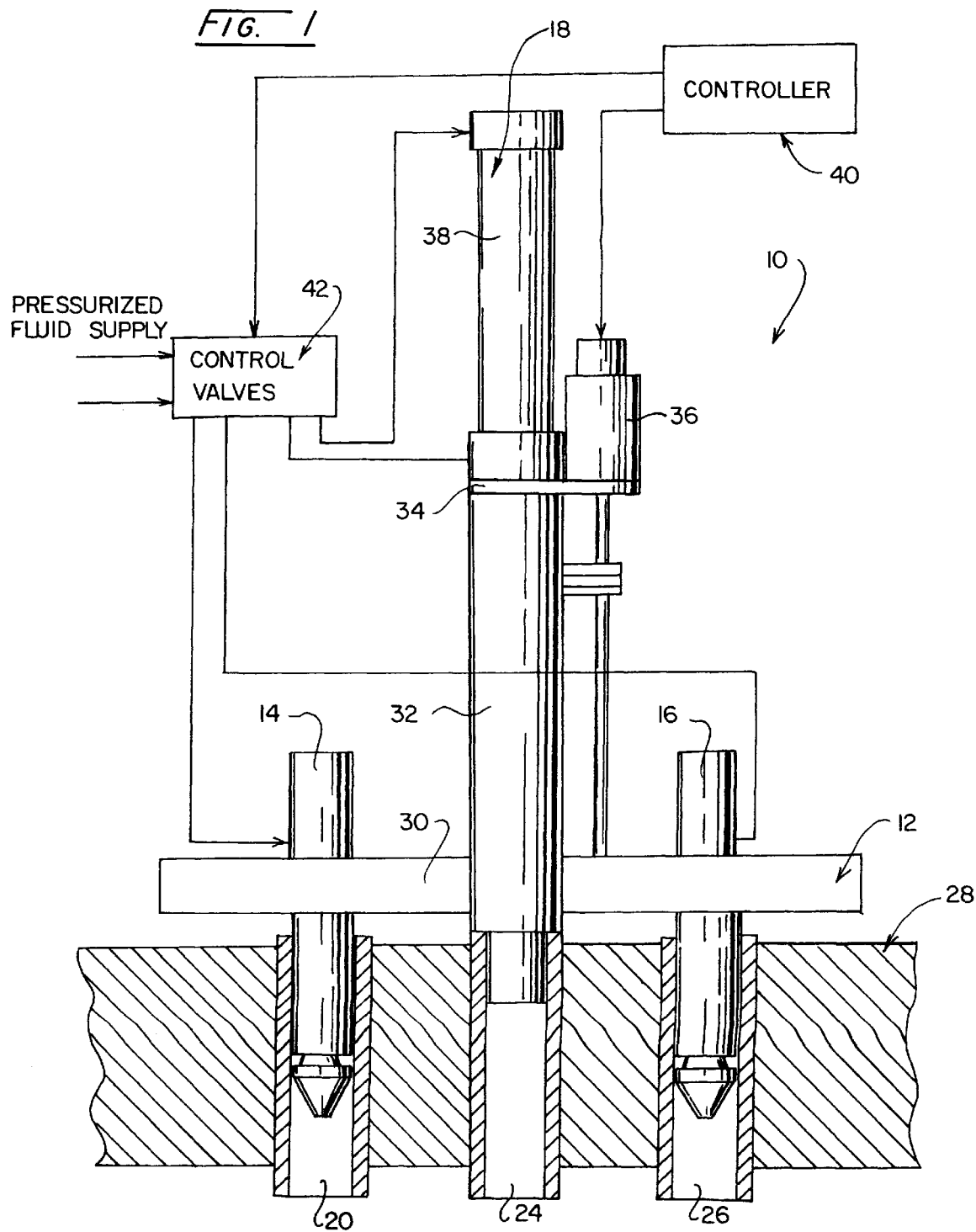
FIG. 1 is schematic elevation view of a preferred embodiment of the apparatus assembly of the present invention illustrating its installed relationship relative to a boiler tube end that is to be removed from installation in a boiler header.

A preferred embodiment of the apparatus of the present invention is designated generally as 10 in the drawings and is an assembly basically comprised of rigid support structure 12, a pair of hydraulically-actuated clamp subassemblies 14 and 16 supported by structure 12, and a hydraulically-actuated tube slitter subassembly 18 also supported by structure 12. Although described as being a "tube slitter", subassembly 18 actually functions to form an compression gap throughout the length of the boiler tube end that is to be removed.

Apparatus assembly 10 is illustrated in FIG. 1 as co-operating with the cut-off ends 20 through 26 of boiler tubes previously installed in boiler header 28. Tube end 24 is the tube element part designated for removal from installation within header 28, and its removal typically occurs in connection with subsequent replacement with a new full-length boiler tube.

Support structure 12 of apparatus 10 is basically comprised of a base element 30, a case element 32 which is connected to base element 30 and which houses the principal cutting tool components of subassembly 18, and a support arm element 34 which is connected to case element 32 and which supports the electrically-actuated stepper motor element 36 of subassembly 18. Case element 32 also supports the hydraulic actuator 38 included in subassembly 18 to accomplish powered reciprocable movement of cutting tools installed within case element 32.

The apparatus 10 system also includes sources of pressurized hydraulic fluid and electrical energy (not illustrated), a conventional selectively-operated controller sub-assembly 40 which controls the actuation of subassemblies 14, 16, and 18 through conventional hydraulic control valves 42, and of stepper motor 36.

Figure 2:
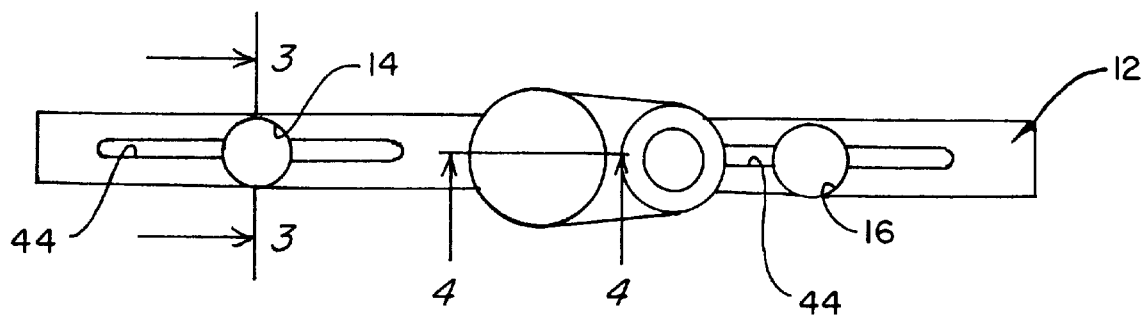
FIG. 2 is a top end plan view of the apparatus assembly of FIG. 1.

FIG. 2 details the elongated slots 44 provided in structure base element 30 to permit lateral adjustments to the positions of hydraulic clamp subassemblies 14 and 16 and thereby facilitate their proper alignment for insertion in respective tube ends 20 and 26.

Figure 3:
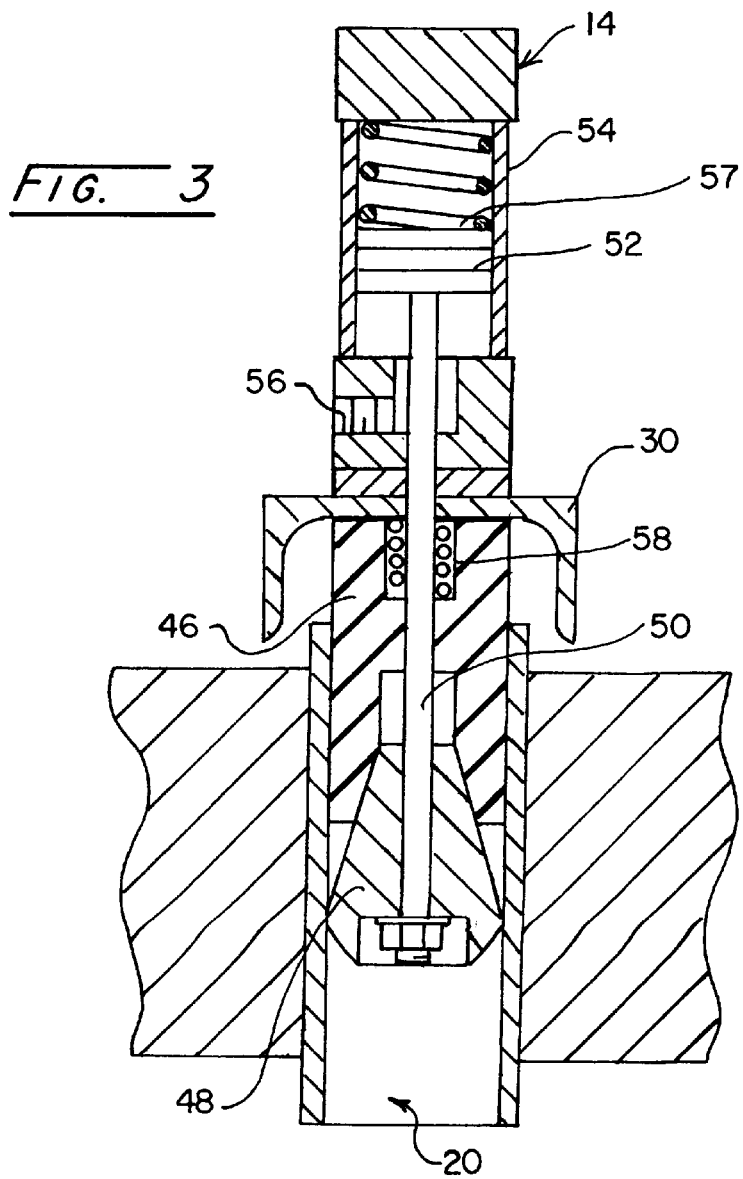
FIG. 3 is a section view through a clamping cylinder subassembly taken at line 3—3 of FIG. 2.

Each clamp subassembly 14 and 16 includes, in addition to disclosed expandable clamping mandrel element 46, a tapered expander element 48 that co-operates with a conical recess in mandrel element 46 and that is connected by a rigid rod 50 to a piston element 52 positioned within a subassembly hydraulic actuator 54. Pressurized hydraulic fluid is flowed into (and from) the interior of hydraulic actuator 54, usually at a fluid pressures of approximately 2,000 psi, through a supply port referenced as 56. When controller 40 operates to open particular control valves 42 to flow pressurized hydraulic fluid to clamping cylinder subassemblies 14 and 16, such flow causes piston element 52, connecting rod element 50, and attached tapered expander element 48 to move upwardly (FIG. 3) and cause the expansion of mandrel element 46 within tube end 20. When the clamping action by subassemblies 14 and 16 is subsequently discontinued and pressurized fluid within actuators 50 is flowed by action of controller 34 and the associated control valve 36 to the hydraulic fluid reservoir provided in apparatus 10, expandable mandrel elements 46 are released from substantial frictional engagement with the interior wall surface of tube ends 20 and 26 through the downward movement of piston 52, rod 50, and expander 48 to permit withdrawal of apparatus 10 from engagement with header 28 and its included tube ends. Spring 57 assists in this downward movement. A tension spring component 58 is connected to base element 30 and to expandable mandrel 46 to maintain the components of subassembly 14 as a unit during insertion/removal in boiler header 28 and during lateral movement in co-operating slot element 44. In one actual embodiment of the invention we preferred that expandable mandrel elements 46 be formed of a dense polyurethane material and that rigid expander element 48 be formed of an aluminum alloy. Alternatively, mandrel 46 can be formed of an aluminum alloy and be partially segmented.

The construction and operation of slitter subassembly 18 included in apparatus 10 is best disclosed by reference to FIGS. 4 and 5 of the drawings. Such subassembly essentially functions in the general manner of a reciprocating, metal-shaving shaper machine tool and includes, in addition to conventional, double-acting hydraulic actuator element 38, a cutting head designated as 60. Cutting head 60 has a generally cylindrical base element 62 that is both slidably contained within structural case 32 and rigidly connected at one end to the actuator rod component 64 of hydraulic actuator 38 by co-operating retainer fitting 66. FIG. 4 illustrates the position of cutting head 60 when rod component 64 of hydraulic actuator 38 is fully retracted. FIG. 5 illustrates the position of cutting head 60 when rod 64 is fully extended. Also, FIGS. 4 and 5 respectively illustrate a subassembly tool holder 68 in its extreme retracted and projected positions before commencing and after completing the cutting of a compression gap in tube end 24.

Cutting head 60 also includes a generally tubular drawbar sleeve element 70 that is rigidly secured to the end of base element 62 opposite retainer fitting 66. Drawbar sleeve 70 has an upper surface opening 72 through which toolholder 68 and its included pair of cutting tool bits 74 and 76 (see FIG. 8) may be advanced into or withdrawn from contact with wall-thickness metal of tube end 24. Toolholder 68 has an inclined under surface 78 that co-operates with the inclined ramp surface 80 of height-adjustment wedge 82 for vertical support, and a contact face 83 that engages an aft face of opening 72 in drawbar sleeve 70. When actuator rod 64 is retracted during a metal-removal stroke, the force required to consequently move engaged cutting tool bits 74 and 76 along their metal-cutting path is transmitted to the tool bits from rod 64 and through retainer fitting 66, slitter head base element 62, attached drawbar sleeve 70, co-operating toolholder face 84, and toolholder 68.

The advancement and retraction of the radial position of toolholder 68 (and included cutting tool bits 74 and 76) within tube end 24 is controlled by actuation of stepper motor 36 and its connected drive train. Such drive drain includes, in part and in addition to height-adjustment wedge 82 which has support wheels 84 and an integral hook 86, an internally-threaded thimble 88 having an integral hook element 90 that engages the integral hook element 86 of wheeled wedge element 82, and an adjustment shaft 92 that is rotatably supported within base element 62 and that has a threaded end 94 that co-operates with the internal thread of thimble element 88.

Figure 6:
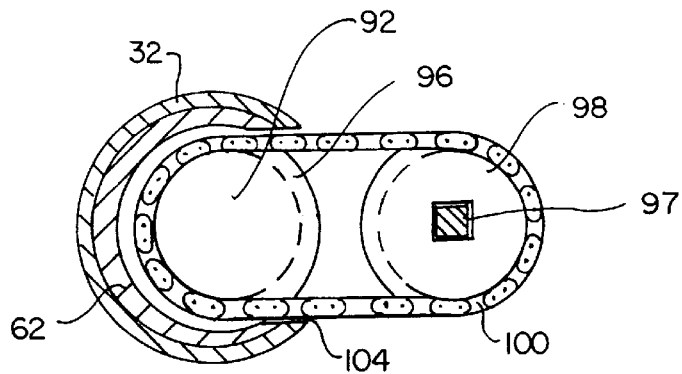
FIG. 6 is a section view taken at line 6—6 of FIG. 4.
Figure 7:
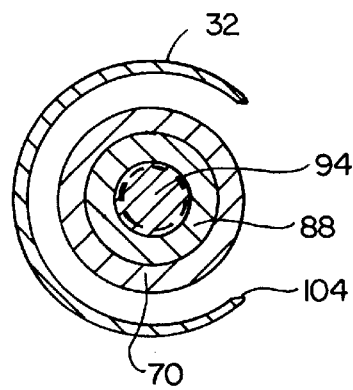
FIG. 7 is a section view taken at line 7—7 of FIG. 4.
Figure 9:
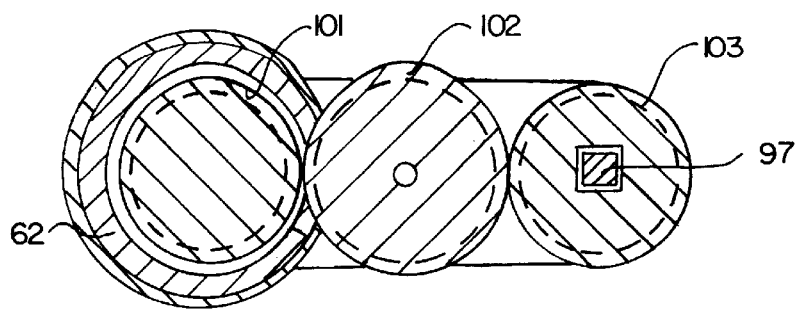
FIG. 9 is a view of a gear drive mechanism.

Also included in the adjustment drive train that is powered by stepper motor 36 are a toothed sprocket 96, preferably formed integral with the end of adjustment shaft 92 opposite threaded end 94, journaled drive shaft 97 connected to stepper motor 36, a toothed sprocket 98 carried by drive shaft 96, and an endless chain element 100 which connects sprockets 96 and 98. (See FIGS. 6 and 7). Note that three meshing gears 101, 102 and 103 shown in FIG. 9 could be substituted for the sprocket and chain drive unit 96, 98, 100.

Although adjustment shaft 92 can rotate relative to its journal support in base element 62, co-operating threaded thimble 88 is prevented from rotating with it by the rotational restraint of wheeled wedge 82 in a bottom-opening slot 102 provided in the lower face of drawbar sleeve element 70 (see FIG. 8) and the interlocking arrangement of wedge hook 86 and thimble hook 90. Also, structure case section 32 is provided with a bottom-opening slot 104 (see FIG. 6) to facilitate the longitudinal movement of chain 100 as actuator rod 64 is extended and retracted and consequently moves adjustment shaft 92, sprockets 96 and 98, and endless chain 100 with it. Further, it should be noted that the support wheels 84 of wheeled wedge element 82 ride on the inner wall surface of boiler tube end 24 as shown in FIGS. 4 and 5.

Figure 8:
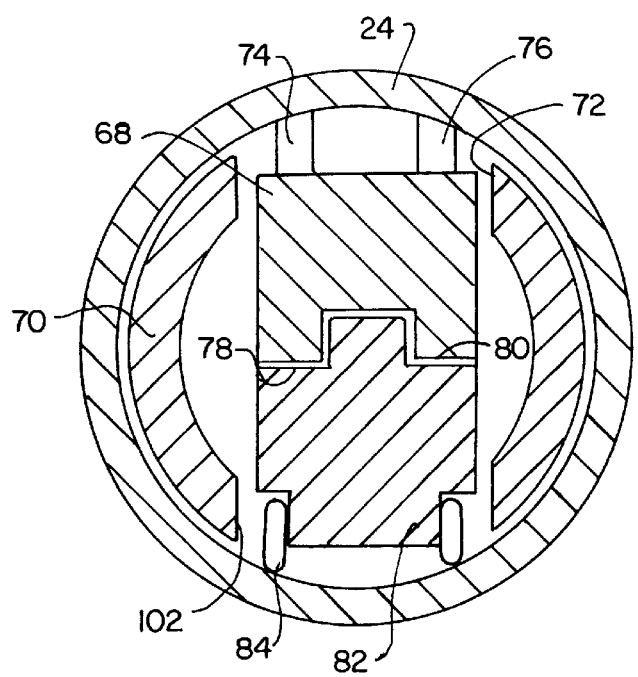
FIG. 8 is a section view taken at line 8—8 of FIG. 4.

FIG. 8 discloses the spaced-apart positioning of tool bits 74 and 76 in their toolholder 68 installation. In one embodiment of our invention we utilize cutting tool bits of approximately one-eighth inch width and with a one-half inch space separating the adjacent tool bits. Thus, the reciprocating toolholder and tool bits, upon completion of the longitudinal cuts, have actually formed a longitudinal gap in the retained boiler tube end that is approximately three-fourths inch wide. Such in effect causes formation of a compression gap in the tube wall that has a larger cross-section than the cross-sectional area of the metal actually removed from the tube end by the cutting action of the tool bits.

Although the toolholder 68 of the preferred embodiment has two radially extending cutter bits 74 and 76, the tube slitter assembly 18 also would function if the toolholder had only one bit. If this were the case the assembly would have to be rotated with respect to a tube to make two parallel slots sequentially.

Boiler tubes to which the present invention has had widest application generally are in the size range of from 2 inches diameter to 4 inches diameter, and with wall thicknesses ranging approximately from 0.095 to 0.180 inches. An operating hydraulic pressure of approximately 2,000 pounds per square inch has proven satisfactory with a cutting head reciprocating frequency of 60 cycles per minute being utilized. (Actuator strokes typically may range to approximately 7–8 inches). Also, the pulsed actuation of the apparatus stepper motor to reposition a 30° inclined ramp surface provided in the apparatus wheeled wedge element has been controlled to move the toolholder and included tool bits radially toward tube end wall metal in increments of 0.006 inches per completed cutting stroke (per cycle).

Summarizing the method steps of the present invention, it is first necessary to conventionally cut each boiler tube to be removed adjacent the boiler headers in which it has been installed and the severed tube length removed. The apparatus of the present invention is located in a manner whereby the tube slitter subassembly 18 is aligned with a tube end of the severed boiler tube and with the apparatus clamp subassemblies 14 and 16 properly inserted in adjacent installed tube ends. Pressurized hydraulic fluid is next ported to the clamp assembly actuators to firmly anchor the invention apparatus in place for forming a compression gap in the wall of the retained tube end using the apparatus tube slitter subassembly 18.

Once the apparatus is firmly anchored, pressurized hydraulic fluid is ported to and from the tube slitter subassembly hydraulic actuator to extend the cutter head and included toolholder and tool bits into the length of the retained tube end. Thereafter, the apparatus stepper motor is actuated to advance the included toolholder and tool bits radially relative to the tube to a desired cutting depth. Subsequently pressurized hydraulic fluid is ported to and from the tube slitter subassembly hydraulic actuator to retract the cutter head and included toolholder and tool bits from the length of the retained tube end to cause two parallel longitudinally extending slots to be formed in the tube wall. Next the apparatus stepper motor is actuated to retract the included toolholder and tool bits radially relative to the tube in preparation for the next cutting cycle. This causes a remaining strip of metal to be defined between the parallel pair of slots which enables the strip to be removed and which when removed together with said slots defines a compression gap.

Subsequently the retained boiler tube end is compressed to substantially close the so-formed compression gap whereby the compressed tube end has a significantly reduced cross-sectional circumference and may be readily withdrawn from retention in the co-operating the boiler header.

We claim our invention as follows:

1. Apparatus for use in removing the severed end portion of a boiler tube having an inner wall surface and an outer wall surface retained in a boiler header and comprising, in combination:

a support structure;

a clamping device connected to said support structure and having a selectively expandable mandrel removably connected to the boiler tube; and a hydraulically-actuated tube slitter device connected to said support structure having a cutter head positioned for reciprocable movement within the boiler tube severed end-portion, said hydraulically-actuated tube slitter device having a metal-shaving plane element that is reciprocated throughout the length of said boiler tube severed end-portion, and having an adjustment mechanism for radially advancing said metal-shaving plane element from the inner wall surface to the outer wall surface of said boiler tube severed end-portion.

2. The apparatus defined by claim 1 wherein said metal shaving plane element comprises a pair of laterally spaced-apart tool bit cutters.

3. The apparatus by claim 1 wherein said adjustment mechanism comprises a wedge element having an inclined ramp surface that supports said cutter head metal-shaving plane element, a co-operating threaded thimble and threaded adjustment shaft connected to said wedge element, and a stepper motor and co-operating drive train connected to said threaded adjustment shaft, bi-directional rotation of said stepper motor causing bi-directional longitudinal movement of said wedge element and bi-directional radial movement of said cutter head metal-shaving plane element.

4. The invention defined by claim 3 wherein said metal-shaving plane element comprises a pair of laterally spaced-apart tool bit cutters.

5. The apparatus defined by claim 1 comprising a hydraulic actuator for expanding said mandrel.

\* \* \* \* \*